Oct. 21, 1924.  
A. D. STEVENS ET AL  
EVAPORATING PAN  
Filed Oct. 22, 1920
1,512,505
2 Sheets-Sheet 1
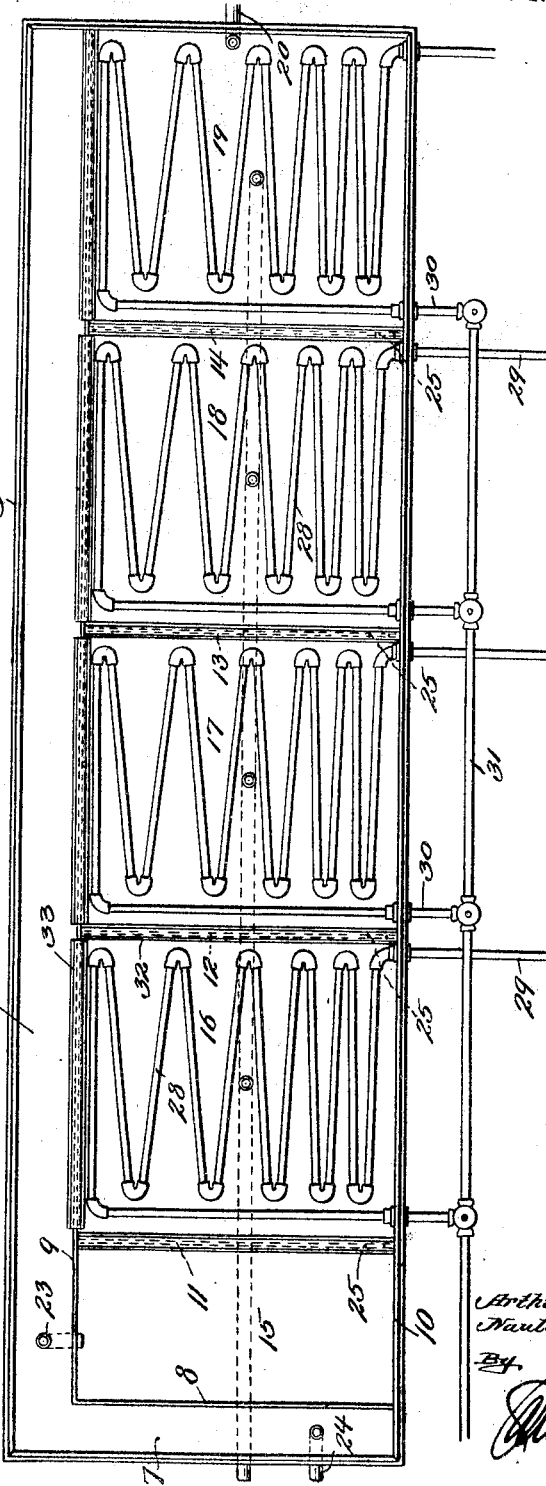

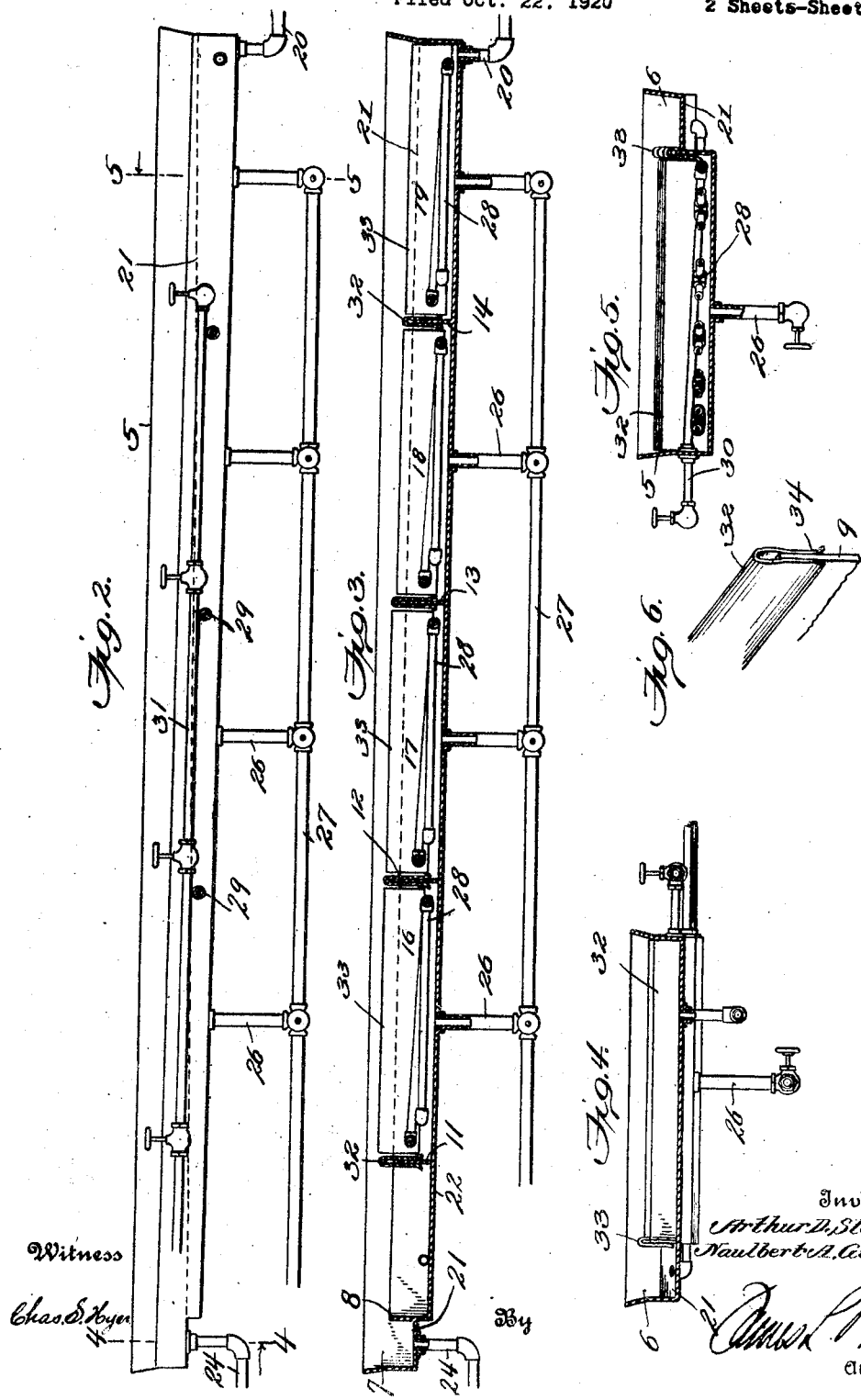

Patented Oct. 21, 1924.

1,512,505

UNITED STATES PATENT OFFICE.

ARTHUR D. STEVENS AND NAULBERT A. GILBERT, OF JACKSONVILLE, FLORIDA.

EVAPORATING PAN.

Application filed October 22, 1920. Serial No. 418,717.

*To all whom it may concern:*

Be it known that we, ARTHUR D. STEVENS and NAULBERT A. GILBERT, citizens of the United States, residing at Jacksonville, in the county of Duval and State of Florida, have invented new and useful Improvements in Evaporating Pans, of which the following is a specification.

This invention relates to a new and useful self-skimming evaporating pan for use in the manufacture of cane syrup from cane juice, and the primary object of the same is to provide means by which the scum produced during heating of the juice is buoyed up by the surface tension of the bubbles of the boiling liquid and constantly carried toward a receiving means or scum trough without again descending into the body of the liquid and whereby all impurities are separated from the juice. The degree of concentration in the improved evaporator pan depends upon the temperature necessary to separate the impurities from the juice and to permit the juice to go to its final evaporating stage free of scum formation. In the present improved evaporating pan a series of compartments with independent heating coils are provided, and said compartments, connected by passages from one compartment to the other, so arranged as not to cause liquid circulation in the compartments, but merely to allow the liquid or juice to pass from one compartment to the other as the treatment progresses, and also to dispose heating or steam coils in the several compartments in such manner as to cause the surface bubbles of the liquid when boiling in the requisite manner to move slowly in the direction of a scum receiver or trough. The improved evaporating pan also contemplates the use of adjustable skimming lips by means of which, together with a particular steam coil arrangement, the surface bubbles of the liquid and the scum carried thereon are caused to flow over into the scum trough at the desired rate. The concentration and consequent temperature in each compartment is controlled by the operator, and all impurities which require a higher temperature to separate them from the juice than is present in the clarifying tank, or about 212° F., are brought to the surface and carried with the bubbles to the scum trough without being boiled into the liquid. The scum rises and is recovered and caused to flow into the scum trough progressively through the successive compartments in varying quantities until the last compartment is reached and which latter compartment serves as a test by showing no scum.

The invention also consists in the construction and arrangement of parts which will be more fully hereinafter described and claimed.

In the drawings:

Fig. 1 is a top plan view of a skimming trough embodying the features of the invention.

Fig. 2 is a side elevation thereof.

Fig. 3 is a longitudinal vertical section of the same.

Fig. 4 is a transverse section taken on the line 4—4, Fig. 2.

Fig. 5 is a transverse section taken on the line 5—5, Fig. 2.

Fig. 6 is a detail view on an enlarged scale showing a portion of one of the skimming lips.

The improved pan may be of any suitable general dimensions with any number of compartments and series of heating coils therein that may be found necessary in carrying out desired operations upon cane syrup or any other liquid with which the improved pan may practically operate.

The numeral 5 designates a pan having at one side thereof a scum trough 6 extending fully from one end to a transverse continuation 7 of the said trough at the opposite end of the pan. The continuation 7 of the trough 6 is divided by a transverse partition 8 extending from an inner longitudinal wall 9 which is essentially at one side of the main body of the pan or the inner wall of the scum trough, the wall 9 being parallel with the opposite side or wall 10 of the pan. Between the walls 9 and 10 the pan is divided by transverse partitions 11, 12, 13 and 14 to respectively form a receiving compartment 15 between the walls 8 and 11 and a series of juice treating compartments 16, 17, 18 and 19, the last compartment 19 in the arrangement of the pan shown in the drawings, being provided with a discharge outlet 20 connected to the bottom thereof. The bottom 21 of the trough 6 is at an elevation above the bottom 22 of the main pan, the trough bottom 21 inclining from the discharge end of the pan or from a point adjacent to the compartment 19 downwardly towards the opposite or receiving end of the pan, and between the scum trough and the receiving or feed compartment 15 a connecting pipe 23 is provided by means of which the scum from the trough may pass into the said receiving or feed compartment. The continuation 7 of the scum trough also has a draining pipe 24 connected thereto by which the scum flowing into the continuation 7 from the trough 6 may be carried off from the pan. Each of the partitions 11, 12, 13 and 14 is formed with an opening 25 therethrough near the bottom 22 of the pan and adjacent to the side wall 10. The bottom of each compartment 16, 17, 18 and 19 has a depending drain pipe connection 26, all of the said latter pipe connections in turn communicating with a common outlet pipe 27, and by means of the pipes 26 and 27, which have suitable valves, the pan may be washed out by introducing wash-water in the receiving or feed compartment 15 and permitting said water to flow through the several compartments, the valves in the pipes 26 being regulated to insure the flow of the water through the compartments and practically flush out the pipes to cleanse the latter. In practice the pan as a whole will be so mounted as to have a slight drain inclination towards the discharge end thereof or the discharge pipe 20, but such inclination will not in the least modify the reverse inclination of the bottom 21 of the scum trough 6. The openings 25 in the partitions 11, 12, 13 and 14 serve as limber holes and insure a practical flow of the juice or liquid treated from one compartment to the other.

Each compartment 16, 17, 18 and 19 has a heating means therein consisting preferably of a plurality of steam coils 28, the coils being in close relation adjacent to the side wall 10 and increasing in the spaces between them gradually in a transverse direction towards the scum trough 6, so that the coils adjacent to the wall 9 have a greater degree of separation and less concentrated heating effect. The closely arranged coils 28 are disposed near the limber holes or openings 25 so as to immediately act upon the juice flowing from one compartment into the other and from the receiving or feeding compartment 15 into the first compartment 16. Each heating means has a steam supply 29 connected to the coil nearest the side wall 10 and running to a common source of steam supply, and attached to the final coil of each heating means is an outlet pipe 30, each of these outlet pipes being connected through its own steam trap to a common return pipe 31 that may run back to a boiler or other source of steam supply. By means of these supply and outlet connections it will be seen that a regular circulation of steam is set up in the heating means or the coils in each compartment, and the degree of heat necessary for treating cane juice or other liquid in the several compartments may be readily controlled by regulating the quantity of steam admitted to the coils. Owing to the closeness of the coils adjacent to the side wall 10 the most intense heating effect of the coils will be adjacent to the inlet of the juice or liquid into the compartments and gradually decrease towards the scum trough.

The improved evaporating pan is also provided with skimming lips 32 and 33 respectively applied to the wall 9 between the compartments and the scum trough 6 and also on the partitions 11, 12, 13 and 14. These skimming lips are shown in detail by Fig. 6 on an enlarged scale and consist of bent spring sheet metal strips 34 which are open at their lower edges so as to be readily applied over or withdrawn from the wall 9 and the partitions 11, 12, 13 and 14. The skimming lips have a frictional engagement with the wall 9 and the partitions 11, 12, 13 and 14 and may be adjusted to any vertical extent as found necessary during the operation of the pan on the juice or liquid supplied thereto.

The operation of the evaporating pan is very simple and consists in supplying the receiving or feeding compartment 15 with hot or cold juice in a continuous stream, or by means which will produce a continuous flow, the juice as treated in the several compartments and finally reaching the compartment 19 in a purified state being discharged through the outlet pipe 20 and taken by the latter to any point distant from the pan for further treatment. When the juice or liquid has covered the coils in each compartment the steam is turned on. The particular position of the limber holes 25 and the arrangement of the steam coils 9 hereinbefore specified, or with the coils in close relation adjacent to the side wall 10 and increasing in spaced relation towards the scum trough, cause the flow of the mass of bubbles produced by the heat from the coils to be in a constant diagonal direction across the pan towards the scum trough and inlet end or compartment 15. It will be understood that the bubbles just referred to will be produced by the boiling action of the juice or liquid in the compartments under the heating influence of the coils. By means of the adjustable skimming lips and independent steam coils in each compartment the height of the boiling mass may be adjusted so that there is a constant flow over the skimming lips 33 on the wall 9 and 32 on the partition or divisional walls 11, 12, 13 and 14, and as a consequence there is a constant flow over the skimming lips 33 into the scum trough 6 and also over the skimming lips on the partitions 14, 13, 12 and 11 toward and into the inlet compartment 15. By this means the scum formed and rising on different parts of the surface of the boiling liquid is supported by the surface tension of the bubbles and carried into the scum trough 6 or the inlet compartment 15 without mixing further with the boiling liquid. The juice flowing into the scum trough 6 with the scum is caused to flow back through the pipe connection 23 into the compartment 15 and be thereby again conducted through the several compartments of the evaporator pan. All of the scum remains on the surface of the inlet compartment 15 or in the scum trough 6 and will be carried off eventually through the scum discharge outlet 24. The concentrated syrup is drawn off through the discharge outlet or pipe 20 connected to the last compartment 19, and this pipe is provided with a valve 35 whereby the said discharge pipe may be opened, either fully or partially, and regulate the degree of concentration.

It is obvious that the general proportions and dimensions of the improved evaporator pan may be modified, and, as hereinbefore indicated, the number of compartments may be increased or decreased as found necessary, and the sizes of the steam heating coils enlarged or diminished in accordance with the variations of the remaining proportions. The improved evaporator pan is comparatively simple in its construction and operation and will be found efficient in relieving cane juice or other liquids of impurities that may be separated and eliminated by the action of heat.

What is claimed is:

1. In an evaporating pan of the class specified, the combination of a pan having a plurality of compartments connected together for the flow of the juice from one compartment to another, adjustable skimming lips between adjacent evaporating compartments and movably mounted upon the walls thereof, a scum trough common to said evaporating compartments, an adjustable skimming lip between the individual compartments and said scum trough, and an individually controllable heating unit for each evaporating compartment.

2. In an evaporating pan of the class specified, the combination with a scum trough, of a plurality of evaporating compartments connected together for the flow of the juice from one compartment to another and having side walls extended laterally with relation to said scum trough and provided with adjustable skimming lips movably mounted thereon, and individual heating units for said evaporating compartments.

3. In an evaporating pan of the class specified, the combination with a scum trough, of a plurality of evaporating compartments connected together for the flow of the juice from one compartment to another and having side walls extending laterally with relation to said scum trough, adjustable skimming lips between said compartments and said scum trough, and individually controllable heating units for said evaporating compartments.

4. In an evaporating pan of the class specified, the combination with a scum trough, of a plurality of evaporating compartments connected together for the flow of the juice from one compartment to another and having side walls extended laterally with relation to said scum trough, adjustable skimming lips between said evaporating compartments movably mounted upon said side walls, adjustable skimming lips between said compartments and said scum trough, and means for heating said evaporating compartments.

5. In an evaporating pan of the class specified, the combination of a pan proper having a scum trough extending along one side thereof and continuing across one end of the pan, the part of the scum trough across one end having a discharge outlet, a plurality of partitions extending transversely across the pan from the scum trough to the opposite pan side to form a plurality of compartments, the partitions being provided with openings to set up communication between the compartments, and heating coils mounted in some of the compartments and having a closer arrangement adjacent to one side of the compartment near the openings through the partitions than the opposite or scum trough side, the heating coils being provided with inlet and outlet means for the heating medium.

In testimony whereof we have hereunto set our hands in presence of two subscribing witnesses.

ARTHUR D. STEVENS.
NAULBERT A. GILBERT.

Witnesses:
ROBBIE E. BOONE,
W. F. BLACKMAN.